(12) United States Patent
Yang et al.

(10) Patent No.: US 8,703,339 B2
(45) Date of Patent: Apr. 22, 2014

(54) POSITIVE ACTIVE MATERIAL AND POSITIVE ELECTRODE FOR RECHARGEABLE LITHIUM BATTERY AND RECHARGEABLE LITHIUM BATTERY INCLUDING THE POSITIVE ELECTRODE

(75) Inventors: Chun-Mo Yang, Suwon-si (KR); Kasai Masahiro, Suwon-si (KR); Sung-Hoon Kim, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 508 days.

(21) Appl. No.: 12/632,761

(22) Filed: Dec. 7, 2009

(65) Prior Publication Data

US 2010/0310934 A1   Dec. 9, 2010

(30) Foreign Application Priority Data

Jun. 5, 2009   (KR) .................. 10-2009-0050053

(51) Int. Cl.
*H01M 4/13* (2010.01)
(52) U.S. Cl.
USPC ............... 429/231.95; 429/231.5; 429/231.6; 429/231.9
(58) Field of Classification Search
USPC ............ 429/231.5, 231.6, 231.9, 231.95
See application file for complete search history.

(56) References Cited

U.S. PATENT DOCUMENTS

| | | |
|---|---|---|
| 5,783,333 A | 7/1998 | Mayer |
| 6,007,947 A | 12/1999 | Mayer |
| 6,379,842 B1 | 4/2002 | Mayer |
| 6,497,854 B2 | 12/2002 | Kohiro et al. |
| 7,198,871 B2 | 4/2007 | Kitao et al. |
| 7,381,496 B2 | 6/2008 | Onnerud et al. |
| 7,410,511 B2 | 8/2008 | Ozaki et al. |
| 7,556,655 B2 | 7/2009 | Dahn et al. |
| 7,604,898 B2 | 10/2009 | Yuasa et al. |
| 7,763,386 B2 | 7/2010 | Hosoya et al. |
| 2003/0180618 A1 | 9/2003 | Inoue et al. |
| 2006/0216601 A1 | 9/2006 | Komiyama et al. |
| 2006/0234115 A1 | 10/2006 | Watanabe et al. |
| 2007/0015058 A1 | 1/2007 | Takezawa et al. |
| 2007/0111097 A1* | 5/2007 | Suhara et al. .............. 429/231.3 |

(Continued)

FOREIGN PATENT DOCUMENTS

| | | |
|---|---|---|
| CN | 1515041 A | 7/2004 |
| CN | 1848483 A | 10/2006 |

(Continued)

OTHER PUBLICATIONS

European Search Report dated Sep. 5, 2010, for corresponding European Patent application 10164915.0.

(Continued)

*Primary Examiner* — Patrick Ryan
*Assistant Examiner* — Ben Lewis
(74) *Attorney, Agent, or Firm* — Christie, Parker & Hale, LLP

(57) ABSTRACT

A positive electrode for a rechargeable lithium battery includes a first positive active material represented by $Li_aNi_bCo_cM_dO_2$, and a second positive active material represented by $Li_eNi_fCo_gMn_hO_2$. M is selected from Al, B, Cr, Fe, Mg, Sr, and V, $0.95 \le a \le 1.1$, $0.5 \le b \le 0.9$, $0 \le c \le 0.3$, $0 \le d \le 0.1$, $0.95 \le e \le 1.1$, $0.33 \le f \le 0.5$, $0.15 \le g \le 0.33$, and $0.3 \le h \le 0.35$. A rechargeable lithium battery includes the positive electrode, a negative electrode and an electrolyte.

18 Claims, 5 Drawing Sheets

(56) References Cited

U.S. PATENT DOCUMENTS

| | | | |
|---|---|---|---|
| 2007/0111098 A1 | 5/2007 | Yang Kook et al. | |
| 2008/0169790 A1* | 7/2008 | Gozdz et al. | 320/160 |
| 2008/0193846 A1 | 8/2008 | Morishima | |
| 2009/0087740 A1 | 4/2009 | Deguchi et al. | |
| 2009/0142651 A1* | 6/2009 | Minami et al. | 429/94 |
| 2009/0297947 A1* | 12/2009 | Deng et al. | 429/218.1 |
| 2010/0099027 A1 | 4/2010 | Kikuya et al. | |

FOREIGN PATENT DOCUMENTS

| | | | |
|---|---|---|---|
| EP | 1 465 271 A1 | 10/2004 | |
| JP | 2000-195513 | 7/2000 | |
| JP | 2002-203554 | 7/2002 | |
| JP | 2002-203555 | 7/2002 | |
| JP | 2002-203556 | 7/2002 | |
| JP | 2002-203557 | 7/2002 | |
| JP | 2003-157832 A | 5/2003 | |
| JP | 2003-272611 A | 9/2003 | |
| JP | 2003-282140 | 10/2003 | |
| JP | 2004-87492 A | 3/2004 | |
| JP | 2005-026141 | 1/2005 | |
| JP | 2005-267956 | 9/2005 | |
| JP | 2005-339970 | 12/2005 | |
| JP | 2006-252895 | 9/2006 | |
| JP | 2007-512668 | 5/2007 | |
| JP | 2007-265731 | 10/2007 | |
| JP | 2008-117611 | * 5/2008 | H01M 4/58 |
| JP | 2008-135245 | 6/2008 | |
| JP | 2008-234872 | 10/2008 | |
| JP | 2008-251532 A | 10/2008 | |
| KR | 10-2004-0072023 | 8/2004 | |
| KR | 10-2004-0106207 | 12/2004 | |
| KR | 1020050091380 A | 9/2005 | |
| KR | 1020060092553 A | 8/2006 | |
| KR | 10-2006-0097630 | 9/2006 | |
| KR | 1020060108110 A | 10/2006 | |
| KR | 1020080100500 A | 11/2008 | |
| WO | WO 2005/053064 A1 | 6/2005 | |
| WO | WO 2008/123011 A1 | 10/2008 | |

OTHER PUBLICATIONS

Patent Abstracts of Japan and English machine translation of Japanese Publication 2008-117611.
Patent Abstracts of Japan and English machine translation of Japanese Publication 2008-135245.
KIPO Office action dated Mar. 1, 2011, for Korean priority Patent application 10-2009-0050053.
Patent Abstracts of Japan, and English machine translation of Japanese Publication 2006-252895, 19 pages.
European examination communication dated Mar. 14, 2012 for corresponding European Application No. 10 164 915.0, 7pp.
Notice of Allowance issued in corresponding Korean Application No. 10-2009-0050053, dated Feb. 8, 2012, 5pp.
European Office action dated Aug. 30, 2011, for corresponding European Patent application 10164915.0, 5 pages.
European Search Report dated Dec. 9, 2010, for corresponding European Patent application 10164915.0.
Patent Abstracts of Japan and English machine translation of Japanese Publication 2005-026141, 30 pages.
Patent Abstracts of Japan and English machine translation of Japanese Publication 2007-265731, 19 pages.
SIPO Office Action dated Jun. 4, 2012 of the corresponding Chinese Patent Application No. 201010196254.7, and English Translation (13 pages).
JPO Office Action dated Aug. 28, 2012 for JP 2010-126891 (3 pages).
Machine English Translation of JP 2004-87492 A (9 pages).
Machine English Translation of JP 2008-251532 A (6 pages).
SIPO Decision of Rejection dated Aug. 9, 2013 for corresponding KR Application No. 10-2010-10196254.7 and English Translation (18 pages).
SIPO Office Action dated Feb. 1, 2013 for CN Application No. 2010-10196254.7 and English Translation (9 pages).
EPO Office action dated Apr. 4, 2013, for corresponding European Patent application 10164915.0, (4 pages).

* cited by examiner

POSITIVE ACTIVE MATERIAL AND POSITIVE ELECTRODE FOR RECHARGEABLE LITHIUM BATTERY AND RECHARGEABLE LITHIUM BATTERY INCLUDING THE POSITIVE ELECTRODE

CROSS-REFERENCE TO RELATED APPLICATION

This application claims priority to and the benefit of Korean Patent Application No. 10-2009-0050053 filed in the Korean Intellectual Property Office on Jun. 5, 2009, the entire contents of which are incorporated herein by reference.

BACKGROUND OF THE INVENTION

1. Field of the Invention

This disclosure relates to a positive active material and a positive electrode for a rechargeable lithium battery and a rechargeable lithium battery including the same.

2. Description of the Related Art

Batteries transform chemical energy generated from an electrochemical oxidation-reduction reaction of chemical materials inside the battery into electrical energy. Batteries are divided into primary batteries, which are discarded after all the energy inside the batteries is consumed, and rechargeable batteries, which can be recharged several times. Among these batteries, rechargeable batteries can be charged/discharged several times through a reversible transformation between chemical energy and electrical energy.

Recent developments in the high-end electronics industry have made electronic devices smaller and lighter, which has led to an increase in portable electronic devices. Since portable electronic devices demand batteries with high energy density, research is ongoing to develop rechargeable lithium batteries to meet these needs.

The rechargeable lithium battery is fabricated by injecting an electrolyte into a battery which includes a positive electrode (including a positive active material capable of intercalating/deintercalating lithium ions) and a negative electrode (including a negative active material capable of intercalating/deintercalating lithium ions).

SUMMARY OF THE INVENTION

According to one embodiment of the present invention, a positive electrode for a rechargeable lithium battery improves cycle life characteristics of the rechargeable lithium battery.

According to another embodiment, a rechargeable lithium battery includes the positive electrode.

According to one embodiment, a positive electrode for a rechargeable lithium battery includes a first positive active material represented by the following Chemical Formula 1 and a second positive active material represented by the following Chemical Formula 2.

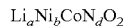  Chemical Formula 1

  Chemical Formula 2

In the above Chemical Formulae 1 and 2, M is selected from Al, B, Cr, Fe, Mg, Sr, and V. Also, $0.95 \leq a \leq 1.1$, $0.5 \leq b \leq 0.9$, $0 \leq c \leq 0.3$, $0 \leq d \leq 0.1$, $0.95 \leq e \leq 1.1$, $0.33 \leq f \leq 0.5$, $0.15 \leq g \leq 0.33$, and $0.3 \leq h \leq 50.35$.

In one embodiment, the first positive active material and the second positive active material are provided at a weight ratio of about 70:50 to about 30:50.

The first positive active material may have an average secondary particle diameter ranging from about 5 μm to about 15 μm, and an average primary particle diameter ranging from about 0.1 μm to about 0.5 μm.

The second positive active material may have an average secondary particle diameter ranging from about 3 μm to about 15 μm.

The positive electrode may have an active mass density ranging from about 2.0 to about 4.0 g/cc, and a loading level ranging from about 10 to about 40 mg/cm².

The positive electrode for a rechargeable lithium battery may further include a conductive material and a binder.

According to another embodiment, a rechargeable lithium battery includes the above positive electrode, a negative electrode and an electrolyte.

DETAILED DESCRIPTION

Figure 1:
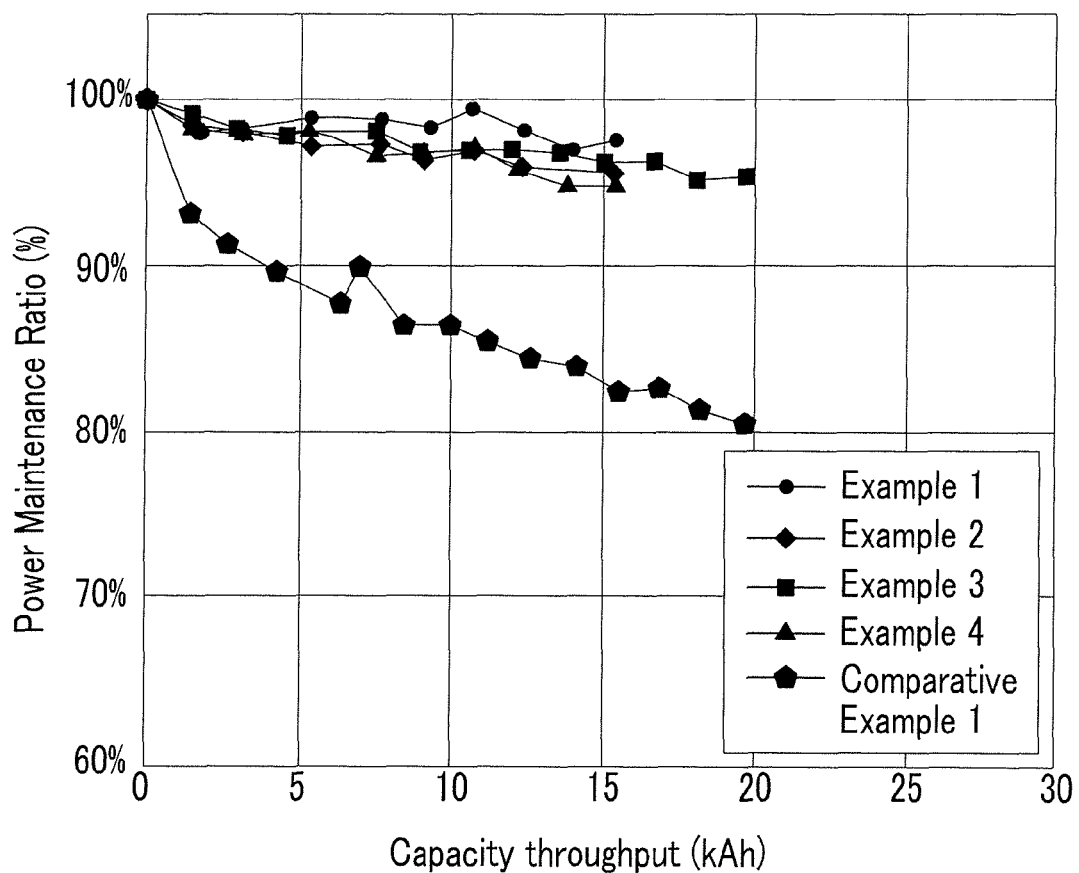
FIG. 1 is a graph comparing the power maintenance ratios of the rechargeable lithium batteries prepared according to Examples 1 to 4 and Comparative Example 1 during charge and discharge cycle.

The invention will be described more fully hereinafter with reference to the accompanying drawings, in which exemplary embodiments are shown. It is understood, however, that the invention may take many different forms and is not limited to the exemplary embodiments set forth herein.

According to one embodiment of the present invention, a positive electrode includes a positive electrode mixture including a positive active material, a conductive material, and a binder.

The positive active material includes a first positive active material represented by the following Chemical Formula 1 and a second positive active material represented by the following Chemical Formula 2.

  Chemical Formula 1

In the above Chemical Formula 1, M is selected from Al, B, Cr, Fe, Mg, Sr, and V. Also, $0.95 \leq a \leq 1.1$, $0.5 \leq b \leq 0.9$, $0 \leq c \leq 0.3$, and $0 \leq d \leq 0.1$.

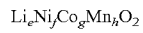  Chemical Formula 2

In the above Chemical Formula 2, $0.95 \leq e \leq 1.1$, $0.33 \leq f \leq 0.5$, and $0.15 \leq g \leq 0.33$, and $0.3 \leq h \leq 0.35$.

The first positive active material is a nickel-cobalt-based active material, and the second positive active material is a nickel-cobalt-manganese-based active material. In one embodiment, the different kinds of active materials are mixed.

The first positive active material has an average secondary particle diameter ranging from about 5 μm to about 15 μm, and an average primary particle diameter ranging from about 0.1 μm to about 0.5 μm. The primary particle diameter refers to a particle diameter of individual particles of each powder, and the secondary particle diameter refers to a particle diameter of agglomerates formed by agglomerating the individual particles (having the first particle diameter).

The second positive active material has an average secondary particle diameter ranging from about 3 μm to about 15 μm.

In one embodiment, the first positive active material and the second positive active material are provided at a weight ratio of about 70:50 to about 30:50.

The positive electrode may have an active mass density ranging from about 2.0. to about 4.0 g/cc. The active mass density is determined by dividing the mass of the positive electrode mixture by the volume. When the active mass density is higher, the amount of positive electrode mixture per unit volume is increased, yielding improved battery capacity.

The positive electrode may have a loading level ranging from about 10 to about 40 $mg/cm^2$. The loading level indicates the amount of positive electrode mixture per unit area is included. When the loading level is higher, the amount of positive electrode mixture per unit area is increased, yielding improved battery capacity.

It is possible to improve the storage-life characteristic after being allowed to stand at a high temperature and to improve cycle-life characteristic by mixing the first positive active material and the second positive active material.

The positive active material may be included in an amount of about 70 to 95 wt % based on the total weight of the positive electrode mixture.

A conductive material may be included to improve electrode conductivity. Any suitable electrically conductive material may be used as a conductive material, so long as it does not cause a chemical change. Nonlimiting examples of suitable conductive materials include polyphenylene derivatives, natural graphite, artificial graphite, carbon black, acetylene black, ketjen black, carbon fibers, and metal powders and metal fibers including copper, nickel, aluminum, silver, and the like.

The conductive material may be included in an amount of about 5 to 30 wt % based on the total weight of the positive electrode mixture.

The binder improves the binding of the positive active material particles to one another, and also to the current collector. Any suitable material may be used for the binder without limitation so long as it improves adherence and does not cause a chemical change. Nonlimiting examples of suitable binders include polyvinyl alcohol, carboxymethyl cellulose, hydroxypropyl cellulose, diacetyl cellulose, polyvinyl chloride, carboxylated polyvinyl chloride, polyvinyl difluoride, ethylene oxide-containing polymers, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resins, and nylon.

The binder may be included in an amount of about 5 to 15 wt % based on the total weight of the positive electrode mixture.

Hereinafter, a rechargeable lithium battery according to another embodiment will be described.

Figure 5:
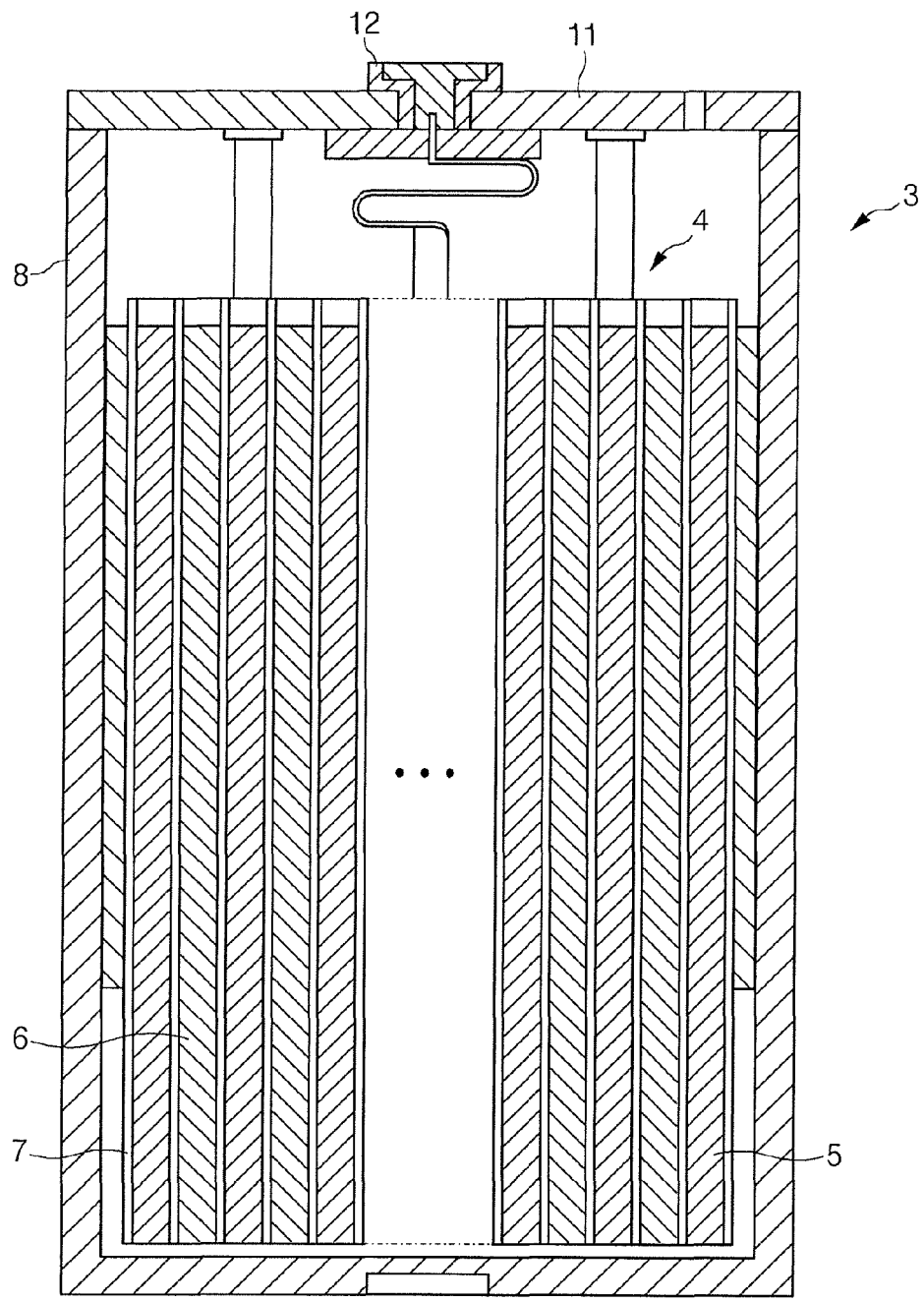
FIG. 5 is a cross-sectional view of a lithium rechargeable battery according to one embodiment of the present invention.

As shown in FIG. 5, a rechargeable lithium battery 3 according to one embodiment includes a battery 4 including a positive electrode 5, a negative electrode 6 facing the positive electrode, a separator 7 between the positive electrode and the negative electrode, and an electrolyte solution impregnating the positive electrode, negative electrode, and separator. The rechargeable lithium battery further includes a battery can 8 for housing the battery, and a cap assembly 11 and sealing member 12 for sealing the battery can.

The shape of rechargeable lithium battery is not limited. For example, the battery may be prismatic, cylindrical, coin-type, button-type, sheet-type laminated, pouch-type and planar. The shape may be selected based on suitability for the intended application.

The positive electrode includes a positive current collector (not shown) and a positive electrode mixture layer formed on the current collector.

The current collector may include aluminum foil, but is not limited thereto.

The positive electrode mixture layer may be formed of the above-described positive electrode mixture, and may be in the form of a slurry.

The negative electrode includes a negative current collector and a negative electrode mixture layer positioned on the current collector.

Nonlimiting examples of suitable negative current collectors include copper foils, nickel foils, stainless steel foils, titanium foils, nickel foams, polymer substrates coated with conductive metals, and metal nets such as metal meshes.

The negative electrode mixture layer includes a negative active material, a conductive material, and a binder.

The negative active material may include a material that reversibly intercalates/deintercalates lithium ions and capable of alloying and dealloying lithium.

The material that reversibly intercalates/deintercalates lithium ions may include carbon materials generally used in the rechargeable lithium ion battery field. Nonlimiting examples of suitable carbon materials include crystalline carbon, amorphous carbon, and mixtures thereof. The crystalline carbon may be shaped or non-shaped. Shaped crystalline carbon may be sheet-shaped, flake-shaped, spherical, or fiber-shaped. The crystalline carbon may be natural graphite or artificial graphite. The amorphous carbon may be soft carbon (carbon obtained through sintering at a low temperature), hard carbon (carbon obtained through sintering at a high temperature), mesophase pitch carbide, fired coke, and so on.

Nonlimiting examples of suitable lithium metal alloys include alloys of lithium and a metal selected from Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

Nonlimiting examples of suitable materials capable of doping and dedoping lithium include Si, $SiO_x$ ($0<x<2$), Si-Q alloys (where Q is selected from alkali metals, alkaline-earth metals, group 13 elements, group 14 elements, transition elements, rare earth elements, and combinations thereof, and is not Si), Sn, $SnO_2$, Sn—R (where R is selected from alkali metals, alkaline-earth metals, group 13 elements, group 14 elements, transition elements, rare earth elements, and combinations thereof, and is not Sn). In one embodiment, at least one of these materials may be used along with $SiO_2$.

Nonlimiting examples of suitable transition metal oxides include vanadium oxide, lithium vanadium oxide, and the like.

The conductive material and binder are the same as described above.

The separator may be a single layer separator or multilayer separators, and may be made of, e.g., polyethylene, polypropylene, and combinations thereof.

The electrolyte includes a non-aqueous organic solvent and a lithium salt.

The lithium salt supplies lithium ions to the battery, enables the basic operation of the rechargeable lithium battery, and improves lithium ion transport between the positive and negative electrodes. Nonlimiting examples of suitable lithium salts include at least one supporting salt selected from $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, and combinations thereof.

The lithium salt may be used at a concentration of about 0.1 to about 2.0M. When the lithium salt is included at a concentration within this range, electrolyte performance and lithium ion mobility may be enhanced due to optimal electrolyte conductivity and viscosity.

The non-aqueous organic solvent acts as a medium for transmitting lithium ions. Nonlimiting examples of suitable organic solvents include carbonate-based solvents, ester-based solvents, ether-based solvents, ketone-based solvents, alcohol-based solvents, and aprotic solvents.

Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When linear carbonate compounds and cyclic carbonate compounds are mixed, an organic solvent having a high dielectric constant and low viscosity can be provided. The cyclic carbonate compounds and linear carbonate compounds may be mixed together at a volume ratio of about 1:1 to about 1:9.

Nonlimiting examples of suitable ester-based solvents include methylacetate, ethylacetate, propylacetate, dimethylacetate, methylpropionate, ethylpropionate, γ-butyrolactone, decanolide, valerolactone, mevalonolactone, caprolactone, and the like.

Nonlimiting examples of suitable ether-based solvents include dibutylether, tetraglyme, diglyme, dimethoxyethane, 2-methyltetrahydrofuran, tetrahydrofuran, and the like.

Nonlimiting examples of suitable ketone-based solvents include cyclohexanone, and the like.

Nonlimiting examples of suitable alcohol-based solvents include ethanol, isopropyl alcohol, and the like.

The non-aqueous organic solvent may include a single solvent or a mixture of solvents. When the organic solvent is a mixture, the mixture ratio can be set in accordance with the desired battery performance.

The non-aqueous electrolyte may further include overcharge inhibition additives such as pyrocarbonate, and the like.

The following examples are presented for illustrative purposes only, and do not limit the scope of the present invention.
Fabrication of Rechargeable Lithium Battery Example 1

$LiNi_{0.8}Co_{0.15}Al_{0.05}O_2$ and $LiNi_{0.5}Co_{0.2}Mn_{0.3}O_2$ were mixed at a weight ratio of 50:50 to provide a positive active material, and carbon black and polyvinyl fluoride were added to provide a positive electrode slurry. A positive electrode was then prepared. Natural graphite was prepared as the negative active material. The electrolyte was prepared by dissolving 1.15M $LiPF_6$ in a mixed solvent (volume ratio of 3:4:3) of ethylene carbonate (EC): ethylmethyl carbonate (EMC): diethyl carbonate (DMC), thereby providing a rechargeable lithium battery.

Example 2

A rechargeable lithium battery was fabricated as in Example 1, except that $LiNi_{0.5}Co_{0.15}Mn_{0.35}O_2$ was used instead of $LiNi_{0.5}Co_{0.2}Mn_{0.3}O_2$.

Example 3

A rechargeable lithium battery was fabricated as in Example 1, except that $LiNi_{0.33}Co_{0.33}Mn_{0.33}O_2$ was used instead of $LiNi_{0.5}Co_{0.2}Mn_{0.3}O_2$. The $LiNi_{0.33}Co_{0.33}Mn_{0.33}O_2$ had an average secondary particle diameter of 3 μm.

Example 4

A rechargeable lithium battery was fabricated as in Example 1, except that $LiNi_{0.33}Co_{0.33}Mn_{0.33}O_2$ was used instead of $LiNi_{0.5}Co_{0.2}Mn_{0.3}O_2$. The $LiNi_{0.33}Co_{0.33}Mn_{0.33}O_2$ had an average secondary particle diameter of 6 μm.

Example 5

A rechargeable lithium battery was fabricated as in Example 1, except that $LiNi_{0.8}Co_{0.15}Al_{0.05}O_2$ and $LiNi_{0.5}Co_{0.2}Mn_{0.3}O_2$ were mixed in a weight ratio of 70:30

Example 6

A rechargeable lithium battery was fabricated as in Example 2, except that the $LiNi_{0.8}Co_{0.15}Al_{0.05}O_2$ and $LiNi_{0.5}Co_{0.15}Mn_{0.35}O_2$ were mixed in a weight ratio of 70:30.

Example 7

A rechargeable lithium battery was fabricated as in Example 3, except that the $LiNi_{0.8}Co_{0.15}Al_{0.05}O_2$ and $LiNi_{0.33}Co_{0.33}Mn_{0.33}O_2$ with average secondary particle diameter of 3 μm were mixed in a weight ratio of 70:30.

Example 8

A rechargeable lithium battery was fabricated as in Example 4, except that the $LiNi_{0.8}Co_{0.15}Al_{0.05}O_2$ and $LiNi_{0.33}Co_{0.33}Mn_{0.33}O_2$ with average secondary particle diameter of 6 μm were mixed in a weight ratio of 70:30.

Comparative Example 1

A positive active material was prepared by mixing 85 wt % of $LiNi_{0.8}Co_{0.15}Al_{0.05}O_2$ with 8 wt % of conductive material and 7 wt % of binder to provide a positive electrode slurry, and thereby provide a positive electrode. Natural graphite was prepared as the negative active material. The electrolyte was prepared by dissolving 1.15M $LiPF_6$ in a mixed solvent (volume ratio of 3:4:3) of ethylene carbonate (EC):ethylmethyl carbonate (EMC):diethyl carbonate (DMC), thereby providing a rechargeable lithium battery.
Assessment 1

Each rechargeable lithium battery prepared according to Examples 1 to 8 and Comparative Example 1 was repeatedly charged and discharged in a 25° C. chamber to measure the discharge power maintenance ratio (%) after the charge and discharge cycle. The discharge power maintenance ratio stands for the ratio of the power maintained after repeating the charge and discharge cycle with respect to the initial power of the rechargeable lithium battery. The results are shown in FIGS. 1 and 2.

Figure 2:
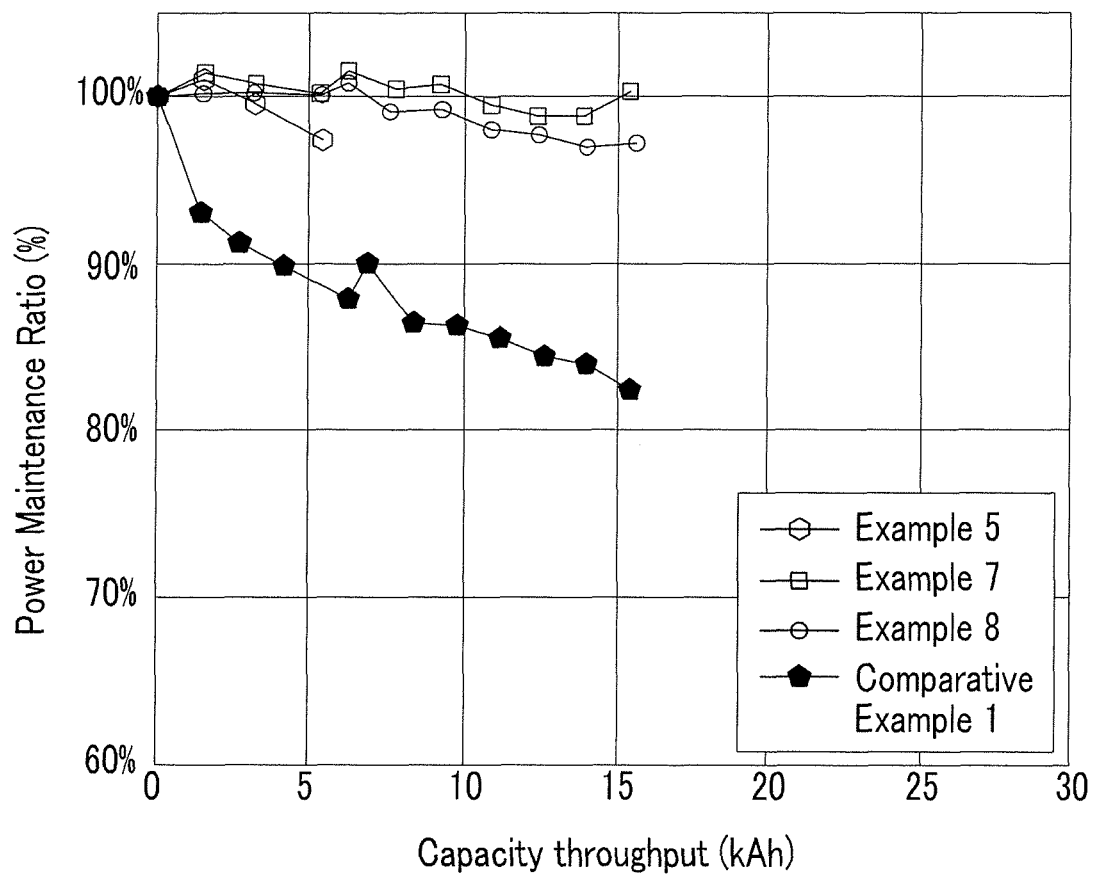
FIG. 2 is a graph comparing the power maintenance ratios of the rechargeable lithium batteries prepared according to Examples 5 to 8 and Comparative Example 1 during charge and discharge cycle.

FIG. 1 is a graph comparing the power maintenance ratios of the rechargeable lithium batteries prepared according to Examples 1 to 4 and Comparative Example 1 during charge and discharge, and FIG. 2 is a graph comparing the power maintenance ratios of the rechargeable lithium batteries prepared according to Examples 5 to 8 and Comparative Example 1 during charge and discharge.

Referring to FIG. 1, it is seen that the rechargeable lithium batteries prepared according to Examples 1 to 4 (including a positive active material including the first positive active material and second positive active material mixed in a ratio of 50:50) had higher discharge power maintenance ratios than that of Comparative Example 1 (including only nickel-cobalt-aluminum oxide as the positive active material).

Particularly, the rechargeable lithium batteries prepared according to Examples 1 to 4 had discharge power maintenance ratios of about 95% or greater until 20 kAh. On the other hand, the rechargeable lithium battery prepared according to Comparative Example 1 had a deteriorated discharge power maintenance ratio of under 90% at 5 kAh and under 80% at 20 kAh.

Similarly, it is seen that the lithium rechargeable batteries prepared according to Examples 5, 7, and 8 (in which the positive active material was prepared by mixing the first positive active material and the second positive active material in a ratio of 70:30) had a higher discharge power maintenance ratio than that of the cell prepared according to Comparative Example 1 (including only nickel-cobalt-aluminum oxide as the positive active material).

From these results, it is seen that cycle-life characteristics are improved when the first positive active material and the second positive active material are mixed.

Assessment 2

The rechargeable lithium batteries prepared according to Examples 1 to 8 and Comparative Example 1 were allowed to stand in a 60% charged state in a 60° C. chamber. The discharge power loss (%) was measured with respect to the initial discharge power at various days after being allowed to stand. The results are shown in FIGS. 3 and 4.

Figure 3:
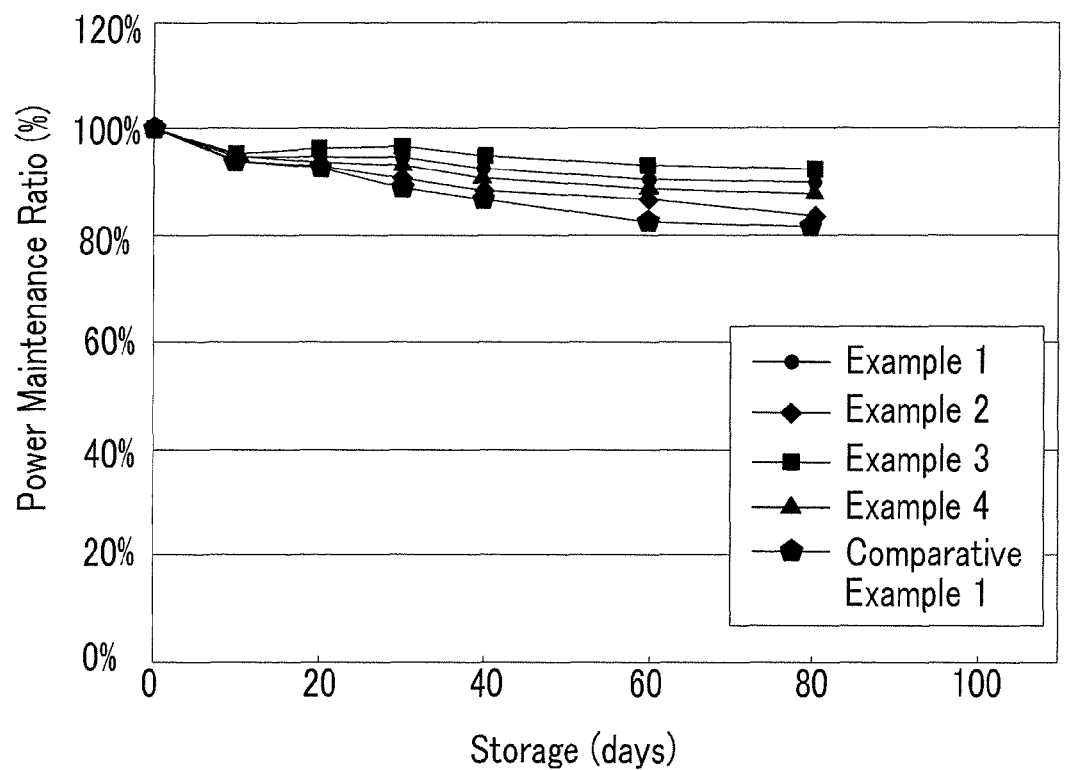
FIG. 3 is a graph comparing the power maintenance ratios of the rechargeable lithium batteries prepared according to Examples 1 to 4 and Comparative Example 1 after being allowed to stand at 60° C. temperature.
Figure 4:
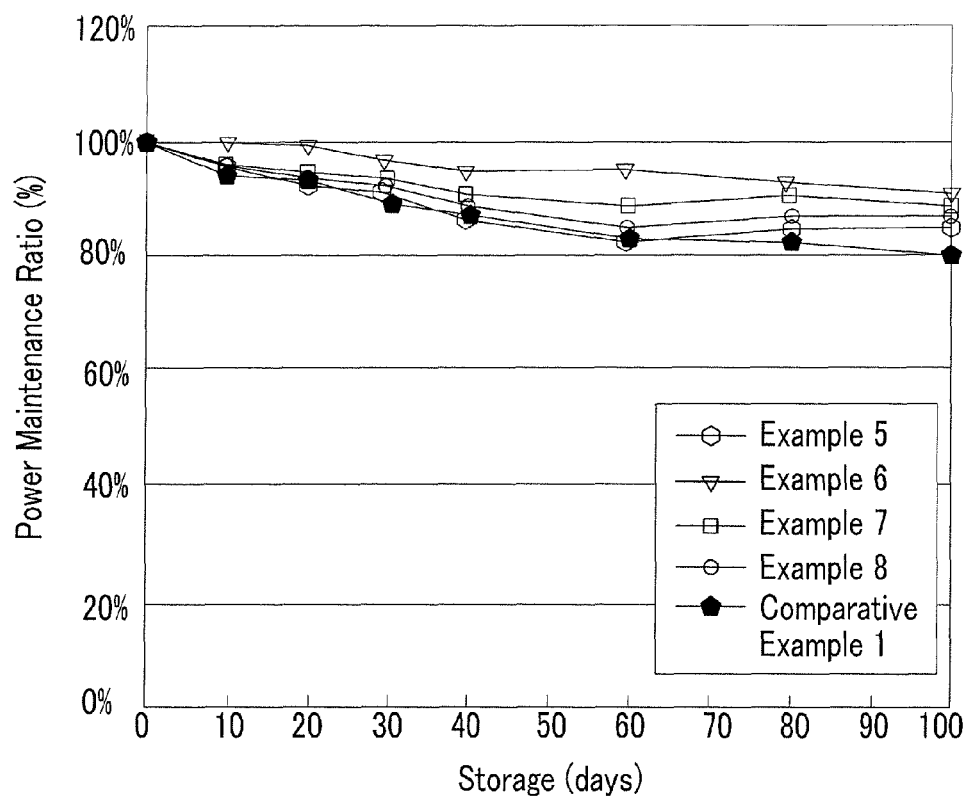
FIG. 4 is a graph comparing the power maintenance ratios of the rechargeable lithium batteries prepared according to Examples 5 to 8 and Comparative Example 1 after being allowed to stand at 60° C. temperature.

FIG. 3 is a graph comparing the power maintenance ratios of the rechargeable lithium batteries prepared according to Examples 1 to 4 and Comparative Example 1 after being allowed to stand at room temperature, and FIG. 4 is a graph comparing the power maintenance ratios of the rechargeable lithium batteries prepared according to Examples 5 to 8 and Comparative Example 1 after being allowed to stand at room temperature.

Referring to FIG. 3, it is seen that the rechargeable lithium batteries prepared according to Examples 1 to 4 (including positive active materials prepared by mixing the first positive active material and the second positive active material in a ratio of 50:50) had higher discharge power maintenance ratios after a certain period than that of the cell prepared according to Comparative Example 1 (including only nickel-cobalt-aluminum oxide as the positive active material).

Similarly, referring to FIG. 4, it is seen that the rechargeable lithium batteries prepared according to Examples 5 to 8 (including positive active materials prepared by mixing the first positive active material and the second positive active material in a ratio of 70:30) had higher discharge power maintenance ratios after a certain period than that of the cell prepared according to Comparative Example 1 (including only nickel-cobalt-aluminum oxide as the positive active material).

From these results, it is confirmed that power is maintained at a greater rate with respect to initial power by the inventive batteries having a positive active material including a mixture of a first positive active material and a second positive active material. The greater power maintenance is achieved even when the inventive batteries are stored for long periods, and the cycle-life characteristics are improved even after being allowed to stand at a high temperature.

While the present invention has been described in connection with certain exemplary embodiments, it is understood by those of ordinary skill in the art that certain modifications may be made to the described embodiments without departing from the spirit and scope of the present invention, as defined by the appended claims.

What is claimed is:

1. A positive active material for a rechargeable lithium battery, consisting of a first positive active material represented by Formula 1 and a second positive active material represented by Formula 2:

$$Li_aNi_bCo_cM_dO_2 \qquad \text{Formula 1}$$

wherein $0.95 \leq a \leq 1.1$, $0.5 \leq b \leq 0.9$, $0 \leq c \leq 0.3$, and $0 \leq d \leq 0.1$, and M is selected from the group consisting of Al, B, Cr, Fe, Mg, Sr, and V;

$$Li_eNi_fCo_gMn_hO_2 \qquad \text{Formula 2}$$

wherein $0.95 \leq e \leq 1.1$, $0.33 \leq f \leq 0.5$, $0.15 \leq g \leq 0.33$, and $0.3 \leq h \leq 0.35$, wherein the first positive active material comprises a plurality of secondary particles and the second positive active material comprises a plurality of secondary particles, and wherein a weight ratio of the first positive active material to the second positive active material ranges from about 70:30 to about 50:50.

2. The positive active material of claim 1, wherein a weight ratio of the first positive active material to the second positive active material ranges from about 70:50 to about 30:50.

3. The positive active material of claim 1, wherein the plurality of secondary particles of the first positive active material have an average diameter ranging from about 5 μm to about 15 μm, and each of the secondary particles of the first positive active material comprises an agglomeration of primary particles.

4. The positive active material of claim 1, wherein the first positive active material comprises a plurality of primary particles having an average primary particle diameter ranging from about 0.1 μm to about 0.5 μm.

5. The positive active material of claim 1, wherein the plurality of secondary particles of the second positive active material have an average diameter ranging from about 3 μm to about 15 μm, and each of the secondary particles of the second positive active material comprises an agglomeration of primary particles.

6. The positive active material of claim 1, wherein the positive active material has an active mass density ranging from about 2.0 to about 4.0 g/cc.

7. The positive active material of claim 1, wherein the positive active material has a loading level ranging from about 10 to about 40 mg/cm$^2$.

8. A positive electrode, comprising the positive active material of claim 1, a conductive material, and a binder.

9. A rechargeable lithium battery comprising
a positive electrode comprising the positive active material of claim 1,
a negative electrode, and
an electrolyte.

10. The positive active material of claim 1, wherein M is Al, and d is greater than 0.

11. The positive active material of claim 10, wherein c is greater than 0.

12. The positive active material of claim 1, wherein the second positive active material comprises the plurality of secondary particles having the average secondary particle diameter ranging from about 3 μm to about 6 μm.

13. The positive active material of claim 1, wherein a weight ratio of the first positive active material to the second positive active material is equal to or less than 70:50.

14. The positive active material of claim 1, wherein:
a weight ratio of the first positive active material to the second positive active material is equal to or less than 70:50,
M is Al,
d is greater than 0, and
c is greater than 0.

15. The positive active material of claim 14, wherein the weight ratio of the first positive active material to the second positive active material is equal to or greater than 50:50.

16. The positive active material of claim 1, wherein $0.95 \leq a \leq 1.1$, $0.5 \leq b \leq 0.9$, $0 \leq c \leq 0.3$, $0 \leq d \leq 0.1$, $0.95 \leq e \leq 1.1$, $0.33 \leq f \leq 0.5$, $0.15 \leq g \leq 0.33$, and $0.3 \leq h \leq 0.35$; and wherein M is Al.

17. The positive active material of claim 16, wherein c is 0.15, and d is 0.05.

18. The positive active material of claim 17, wherein a is 1, and b is 0.8.

* * * * *

UNITED STATES PATENT AND TRADEMARK OFFICE
CERTIFICATE OF CORRECTION

PATENT NO. : 8,703,339 B2  
APPLICATION NO. : 12/632761  
DATED : April 22, 2014  
INVENTOR(S) : Chun-Mo Yang et al.

It is certified that error appears in the above-identified patent and that said Letters Patent is hereby corrected as shown below:

In the Claims

Column 9, Claim 16, line 23     Delete "$0 \leq c \leq 0.3, 0 \leq d \leq 0.1$,"  
                                                  Insert -- $0 < c \leq 0.3, 0 < d \leq 0.1$, --

Signed and Sealed this  
Fourteenth Day of June, 2016

Michelle K. Lee  
*Director of the United States Patent and Trademark Office*